(12) United States Patent
Nieuwejaar

(10) Patent No.: US 9,921,756 B2
(45) Date of Patent: Mar. 20, 2018

(54) METHOD AND SYSTEM FOR SYNCHRONIZING AN INDEX OF DATA BLOCKS STORED IN A STORAGE SYSTEM USING A SHARED STORAGE MODULE

(71) Applicant: EMC Corporation, Hopkinton, MA (US)

(72) Inventor: Nils Nieuwejaar, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 148 days.

(21) Appl. No.: 14/983,319

(22) Filed: Dec. 29, 2015

(65) Prior Publication Data

US 2017/0185316 A1 Jun. 29, 2017

(51) Int. Cl.
| | | |
|---|---|---|
| *G06F 13/20* | (2006.01) | |
| *G06F 17/00* | (2006.01) | |
| *G06F 7/00* | (2006.01) | |
| *G06F 17/30* | (2006.01) | |
| *G06F 13/00* | (2006.01) | |
| *G06F 13/28* | (2006.01) | |
| *G06F 3/06* | (2006.01) | |
| *H04L 29/08* | (2006.01) | |
| *G06F 13/42* | (2006.01) | |

(52) U.S. Cl.
CPC ........... *G06F 3/0611* (2013.01); *G06F 3/065* (2013.01); *G06F 3/067* (2013.01); *G06F 3/0619* (2013.01); *G06F 3/0685* (2013.01); *G06F 13/4282* (2013.01); *H04L 67/1097* (2013.01)

(58) Field of Classification Search
CPC ......... G06F 17/30159; G06F 17/30156; G06F 3/0619; G06F 3/065; G06F 3/067; G06F 17/30575; G06F 17/30212; G06F 3/0647; G06F 3/0641; G06F 17/30336; G06F 11/1453; G06F 11/1446; G06F 11/1466
USPC ................ 710/313; 707/640, 741, 634, 655, 707/999.204, 637, 649, 652, 659; 711/162
See application file for complete search history.

(56) References Cited

U.S. PATENT DOCUMENTS 5,742,792 A * 4/1998 Yanai .................... G06F 3/0601
710/1
6,317,815 B1 * 11/2001 Mayer ................... G06F 3/0607
711/162

(Continued)

*Primary Examiner* — Faisal M Zaman
(74) *Attorney, Agent, or Firm* — Womble Bond Dickinson (US) LLP

(57) ABSTRACT

A storage system includes a first and second control modules (CMs) connected to a client and a storage module over a communication fabric. In response to a data fragment written to the storage module, the first CM is to create a table of contents (TOC) entry in a TOC page maintained in a first storage partition of the storage module, update its FTL map, determine whether the TOC page contains a predetermined number of TOC entries, and in response to determining that the TOC page contains the predetermined number of TOC entries, send a control signal to the second CM via an inter-processor link. In response to the control signal received from the first CM via the inter-processor link, the second CM is to copy the TOC page from the first storage partition to a memory associated with the second CM to allow the second CM to update its FTL map.

24 Claims, 12 Drawing Sheets

(56) References Cited

U.S. PATENT DOCUMENTS

| | | | |
|---|---|---|---|
| 6,782,444 B1* | 8/2004 | Vishlitzky | G06F 12/0871 |
| | | | 711/113 |
| 7,325,110 B2* | 1/2008 | Kubo | G06F 11/1466 |
| | | | 711/100 |
| 7,975,061 B1* | 7/2011 | Gokhale | G06F 3/0605 |
| | | | 709/231 |
| 8,352,435 B1* | 1/2013 | Ruef | G06F 11/2066 |
| | | | 365/201 |
| 8,554,963 B1 | 10/2013 | Shapiro et al. | |
| 8,589,659 B1 | 11/2013 | Shapiro | |
| 8,769,055 B2* | 7/2014 | Murphy | G06F 11/1451 |
| | | | 707/634 |
| 8,954,446 B2* | 2/2015 | Vijayan Retnamma | |
| | | | G06F 11/1453 |
| | | | 707/659 |
| 9,003,090 B1 | 4/2015 | Davis | |
| 9,639,591 B2* | 5/2017 | Segev | G06F 17/30578 |
| 2002/0059237 A1* | 5/2002 | Kumagai | G06F 21/10 |
| 2003/0140070 A1* | 7/2003 | Kaczmarski | G06F 11/1466 |
| 2011/0173640 A1* | 7/2011 | Kreuzenstein | G06F 13/24 |
| | | | 719/328 |
| 2013/0176888 A1* | 7/2013 | Kubota | H04L 45/38 |
| | | | 370/252 |
| 2013/0339299 A1* | 12/2013 | Muller | G06F 17/30283 |
| | | | 707/640 |
| 2016/0343429 A1* | 11/2016 | Nieuwejaar | G06F 3/0611 |

* cited by examiner

METHOD AND SYSTEM FOR SYNCHRONIZING AN INDEX OF DATA BLOCKS STORED IN A STORAGE SYSTEM USING A SHARED STORAGE MODULE

FIELD OF THE INVENTION

Embodiments of the present invention relate generally to data storage systems. More particularly, embodiments of the invention relate to efficiently storing data in a storage system.

BACKGROUND

The speed at which a system can write data to persistent storage and read data from persistent storage is often a critical factor in the overall performance of the system. The traditional approach to reading data from and writing data to persistent storage requires processing by multiple layers in the system kernel and by multiple entities in the hardware. As a result, reading data from and writing data to persistent storage introduces significant latency in the system and, consequently, reduces the overall performance of the system.

In addition, data stored in a solid state storage device is in a form of a data block. Each data block includes multiple data pages. Each data page includes multiple frags (e.g., data fragments or data chunks). For each of the frags, a table of contents (TOC) entry is constructed, where the TOC entry includes information describing the corresponding frag. In addition to the TOC pages stored on a storage device, a storage system may construct an in-memory flash translation layer (FTL) map, allowing the storage system to rapidly determine a storage location of a frag without referring to the TOC entry stored on the storage device. The operations constructing a TOC page may consume relatively high processing resources and time. In a multiprocessing storage system, multiple components may have to maintain its own copy of the FTL map. Keeping multiple copies of an FTL map synchronized may significantly increase the time and resources required to store data.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a storage system includes a first and second control modules (CMs) connected or coupled to a client and a storage module over a communication fabric. In response to a data fragment written to the storage module, the first CM is to create a table of contents (TOC) entry in a TOC page maintained in a first storage partition of the storage module, determine whether the TOC page contains a predetermined number of TOC entries, and in response to determining that the TOC page contains the predetermined number of TOC entries, send a control signal to the second CM via an inter-processor link. In response to the control signal received from the first CM via the inter-processor link, the second CM is to copy the TOC page from the first storage partition to a memory of the second CM (also referred to as a CM memory). The second CM then examines TOC entries of the TOC page and updates its own FTL map maintained in its CM memory based on TOC entries of the TOC page. The FTL map is utilized by the first CM to service requests for accessing data frags received from clients.

In such a configuration, the first CM operates as a primary CM while the second CM operates as a secondary CM for the purpose of redundancy, protection, or fault tolerance. Since the first CM and the second CM share the storage module over a communication fabric, the second CM does not have to construct the same TOC page, which may be time and resource consuming. Rather, the second CM copies the TOC page from the one constructed by the first CM and updates its own FTL map based on the TOC page constructed by the first CM. In addition, once a TOC entry has been constructed in the first storage partition, the first CM can acknowledge a write request of the data frag to the client, without having to wait for an acknowledgement from the second CM.

Figure 1:
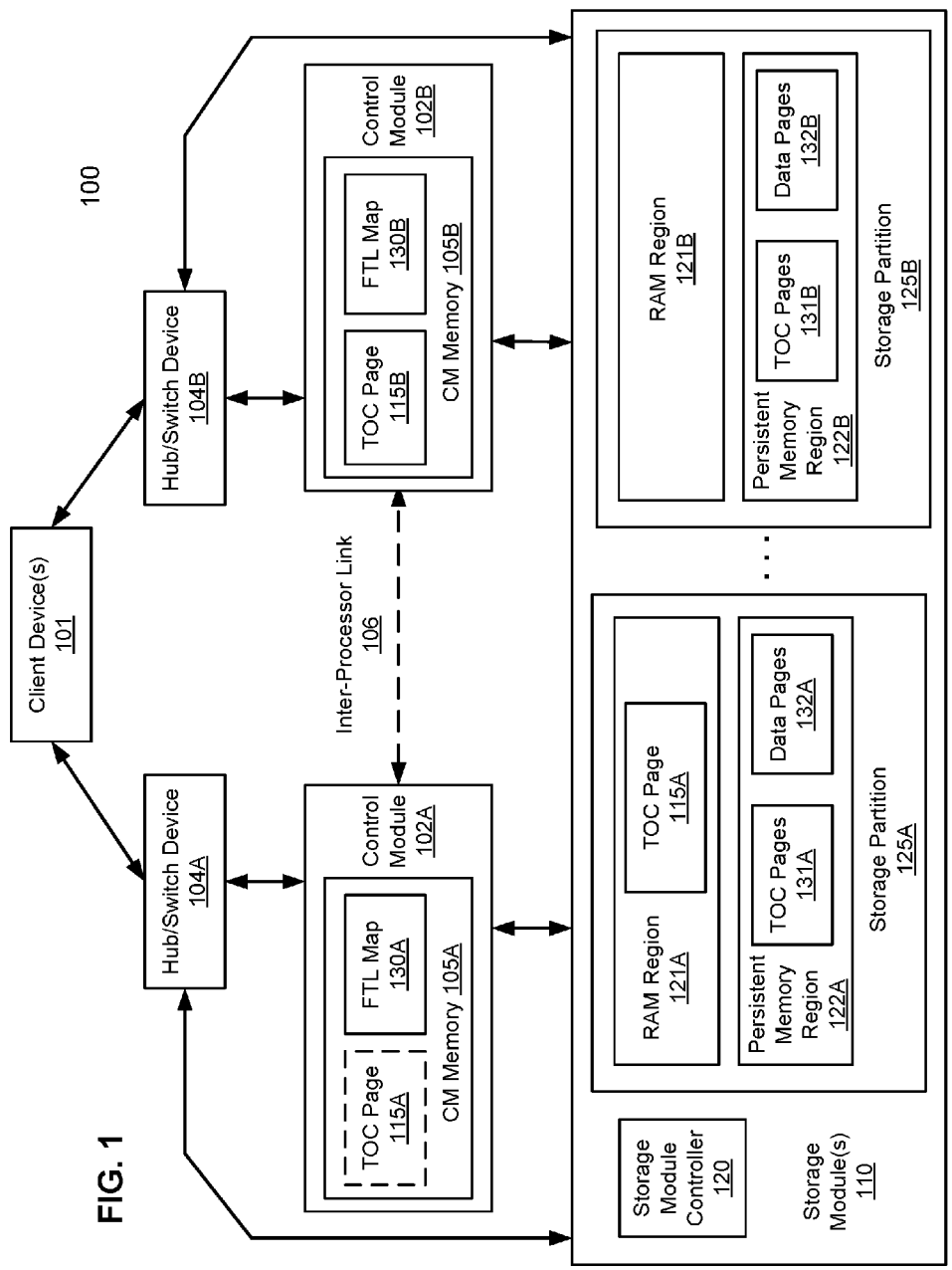
FIG. 1 is a block diagram illustrating a storage system according to one embodiment of the invention.

FIG. 1 is a block diagram illustrating a storage system according to one embodiment of the invention. Storage system 100 may represent any storage server, such as a cloud storage server, a content server, etc. Referring to FIG. 1, storage system 100 includes one or more client devices 101 (also simply referred to as clients) communicatively connected or coupled to control modules 102A-102B and one or more storage modules 110 via one or more hub or switch devices 104A-104B. Although only one client 101 is shown, multiple clients can be applicable. Similarly, although only one storage module 110 is shown, multiple storage modules can also be applied and more CMs can be utilized in addition to CMs 102A-102B, dependent upon the specific configurations or requirements. Further, each of CMs 102A-102B may include a processor and a local memory such as CM memory devices 105A-105B (collectively referred to as CM memory devices 105). CM memory devices 105 may be any kinds of volatile memory devices, such as Dynamic Random-Access Memory (DRAM), Synchronous DRAM, SDR SDRAM, or DDR SDRAM.

In one embodiment, client 101 is connected or coupled to CMs 102A-102B and storage module 110 via a communication fabric, while CM 102A and CM 102B are connected or coupled to each other via an inter-processor link 106 (also referred to as a processor interconnect). In this example, for the illustration purpose, the communication fabric is represented by the solid lines or connections amongst components 101-104B and 110, while inter-processor link 106 is represented by a dash line or dash connection. The communication fabric, represented by the solid lines and hub/switch devices 104A-104B in this example, may be a full mesh communication fabric that allows each of the components 101-104B and 110 to communicate with each other and to access resources (e.g., memory, processing resources) of each other.

In one embodiment, storage system 100 may be a server or a part of a cluster of servers to provide data storage or content services to remote devices over a network (e.g., the Internet). For example, client device 101 may be a frontend server component (e.g., Web server, content server, or cloud server) connected or coupled to a backend storage appliance represented by CMs 102A-102B and storage module 110. In such a configuration, client 101 operates as a server to provide services to remote devices over the Internet, while client 101 operates as a client to the storage appliance represented by CMs 102A-102B and storage module 110 over a communication fabric. CMs 102A-102B, also collectively referred to as CMs 102, may operate as a storage controller or server component of the storage appliance.

In one embodiment, storage system 100 may be implemented within an electronic rack. For example, client 101 may be implemented as a part of a client blade or plane inserted into a backplane representing a communication fabric (represented by the solid connections and hub/switch devices 104A-104B). CMs 102A-102B may be implemented as a part of one or more control blades or control planes inserted into the backplane. Storage module 110 may be implemented as a part of storage blade (or storage plane or data plane) inserted into the backplane. Thus, all of the blades are connected or coupled to each other via the communication fabric using various appropriate communication protocols, while CMs 102A-102B are connected or coupled to each other via inter-processor link 106, which may be a dedicated private connection, or part of the communication fabric within or amongst the control blade(s). Other configurations may exist.

In one embodiment, storage module 110 includes one or more random access memory (RAM) devices and one or more persistent storage devices, which may be controlled or managed by a storage module controller 120. The RAM devices and the persistent storage devices of storage module 110 may be logically or physically partitioned into storage partitions 125A-125B (collectively referred to as storage partitions 125). Storage partitions 125A-125B may be allocated for CMs 102A-102B, respectively. Each of the storage partitions 125A-125B includes a corresponding RAM region such as RAM regions 121A-121B (collectively referred to RAM 121). RAM devices can be any types of volatile memory devices, such as, Dynamic Random-Access Memory (DRAM), Synchronous DRAM, SDR SDRAM, or DDR SDRAM. Similarly, each of storage partitions 125A-125B includes a corresponding persistent memory or storage region such as persistent memory regions 122A-122B (collectively referred to as persistent memory regions 122). Persistent storage regions 122 can be any kinds of non-volatile storage devices, such as NAND flash memory, NOR flash memory, magnetic RAM (M-RAM), spin torque magnetic RAM (ST-MRAM), phase change memory (PCM), memristive memory, any other memory defined as non-volatile storage class memory (SCM), magnetic disks, or optical disks. CMs 102A-102B may communicate with storage module controller 120 over the communication fabric to access storage locations of storage partitions 125.

In one embodiment, storage module controller 120 is configured to receive requests to read from and/or write data to CMs 102A-102B. Further, storage module controller 120 is configured to service the read and write requests using storage partitions 125A-125B. In addition, storage module controller 120 may include a direct memory access (DMA) engine to move or copy data between storage partitions 125, CM memory devices 105, and a client memory of client 101 (not shown). In one embodiment, the communication fabric can be any kinds of high speed communication fabrics, such as, for example, a PCIe, Ethernet, Fabre channel, or Infini-Band™ fabric. Inter-processor link 106 may be a dedicated private connection between two CMs 102A-102B or it may be implemented as part of the communication fabric.

Client 101 may be any system that includes functionality to issue a read request to a storage appliance and/or issue a write request to the storage appliance. Client 101 may include a client processor and client memory (not shown). In one embodiment client 101 is configured to communicate with the storage appliance (represented by control modules 102A-102B and one or more of storage module 110) using a variety of communication protocols, such as, peripheral component interconnect (PCI), PCI-Express (PCIe), PCI-eXtended (PCI-X), non-volatile memory express (NVMe), non-volatile memory express (NVMe) over a PCIe fabric, non-volatile memory express (NVMe) over an Ethernet fabric, and non-volatile memory express (NVMe) over an InfiniBand fabric.

In one embodiment, the commands and responses/acknowledgements exchanged amongst client 101, CMs 102A-102B, and storage module 110 may be exchanged via corresponding submission queues and completion queues maintained in various memories associated with these components. For example, Each of CM memories 105A-105B may contain individual or separate submission queues and completion queues for client 101 and storage module 110. Similarly, a client memory of client 101 may maintain a submission queue and a completion queue for each of CMs 102A-102B. A submission queue is used by an end point to submit a command to another end point over the communication fabric for a particular operation. A completion queue is used by an end point to place an acknowledgment or response to a command previously submitted via a submission queue to signal another end point that the command has been completed.

For example, when client 101 initiates a read request to CM 102A, client 101 would place a read request command in submission queue associated with CM 102A maintained in memory 105A. By placing a command in the submission queue, CM 102A may be notified, for example, via an interrupt (e.g., doorbell interrupt). Similarly, when CM 102A completes a command issued from client 101, CM 102A would place an indicator (e.g., an acknowledgment, response) in a completion queue associated with client 101 to signal client 101 that the command has been executed. The completion queue associated with client 101 may be maintained in a client memory of client 101.

CM 102A may have read and write access rights or privileges to its storage partition 125A and has read-only access rights or privileges to storage partition 125B. Similarly, CM 102B may have read and write access rights to storage partition 125B and read-only access rights to storage partition 125A. Alternatively, both CMs 102A-102B may have read and write access rights to all memory regions and storage regions, as long as storage module controller 120 can manage or control the access contention and/or conflicts/coherency, or if the CMs 102A-102B can directly arbitrate access between them, or have established a prior protocol governing the sharing of access.

Typically, client 101 can access data stored in a storage region associated with CM 102A via a first communication path through CM 102A. Likewise, client 101 can access data stored in a storage region associated with CM 102B via a second communication path through CM 102B. Both paths may be available for client 101 simultaneously for a better bandwidth. Alternatively, one path may be a redundant or alternative path for the other path. When one path (e.g., path through CM 102B) is unavailable (e.g., due to a failure), client 101 can go through the other path (e.g., a path through CM 102A) to read or write data from or to a storage region associated with the unavailable path. Further information concerning client 101, CMs 102A-102B, and storage module 110, as well as the communication fabric, will be described in details further below with respect to FIGS. 5A-5D and 6-7.

In one embodiment, persistent memory regions 122A-122B may be allocated from one or more flash memory devices. Typically, data may be stored in a flash memory device in blocks. Each block contains one or more data pages (e.g., data pages 132A-132B) and metadata describing the data pages (e.g., TOC pages 131A-131B). For example, the metadata of a block includes a table of contents (TOC), where a TOC includes one or more TOC pages. Each TOC page contains information describing one or more data pages contained in the block. Each data page includes one or more data fragments or frags (also referred to as data chunks or data segments). Each TOC page includes one or more TOC entries, each TOC entry having information or metadata describing one of the frags in an associated data page. The data received from client 101 is in a form of frags. Based on the frags received from client 101, data pages and the associated TOC pages are constructed. The data pages and TOC pages are then packaged into a block, which is then written in a storage location of a flash memory device. Further information concerning data pages and TOC pages in a block are described in details further below in FIGS. 4A-4I and 5A-5E.

Figures 4A, 4B, 4C, 4D:
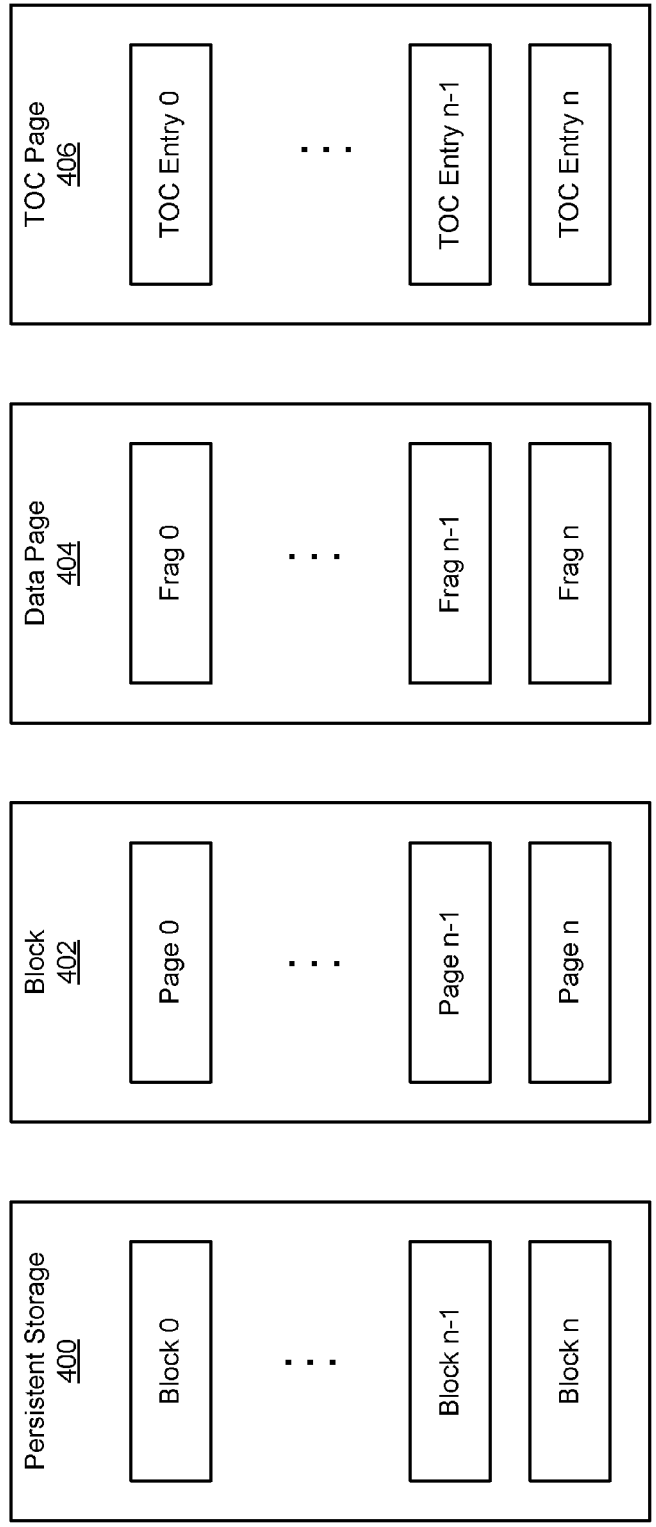
FIGS. 4A-4F are block diagrams illustrating examples of data structures of data stored in a storage system according to certain embodiments of the invention.
Figures 4E, 4F:
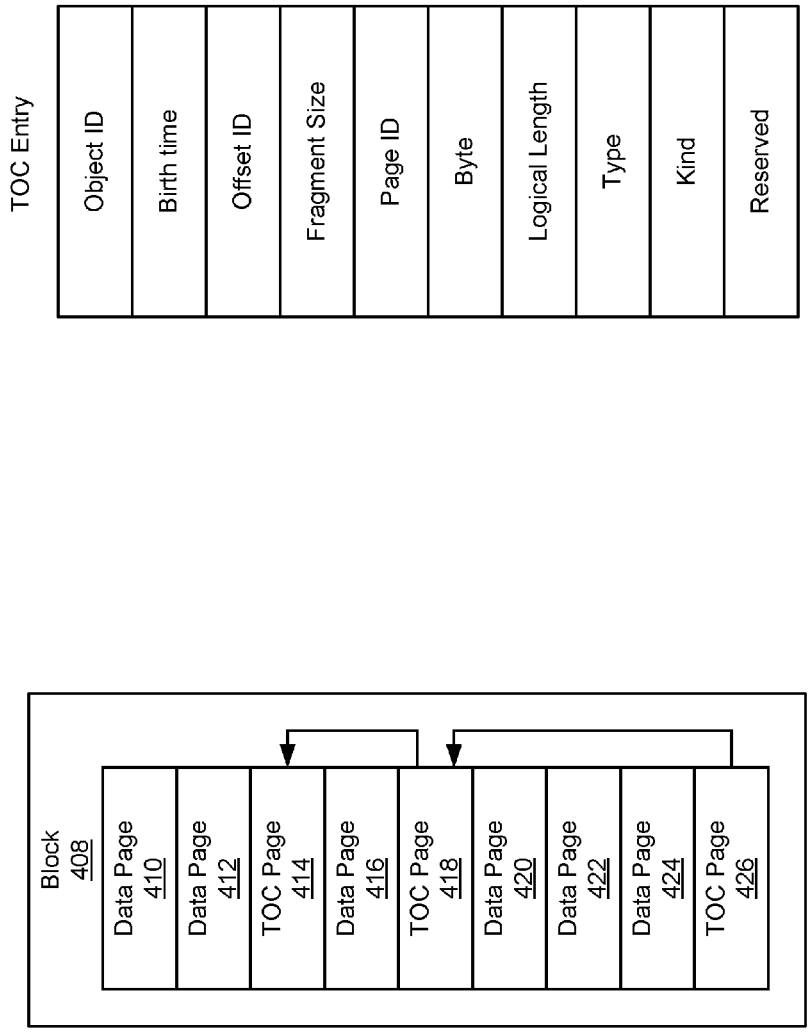

According to one embodiment, during the system startup prior to servicing client 101, each of CMs 102A-102B is configured to scan persistent memory regions 122A-122B to read and examine TOC entries of TOC pages 131A-131B. Based on the information provided by the TOC entries, each CM generates and populates an FTL map, such as FTL maps 130A-130B, respectively. An example of a TOC page is shown in FIG. 4D and an example of a TOC entry is shown in FIG. 4E, which will be described in details further below. FTL maps 130A-30B may be utilized by CMs 102A-102B to service requests for accessing data pages 132A-132B from client 101, respectively, without having to refer to TOC pages 131A-131B. In one embodiment, each of FTL maps 130A-103B includes a number of FTL map entries, each having summary information describing one of the data frags fully described by the TOC entries of TOC pages 131A-131B. The map entries of a FTL map may be sorted based on an object identifier and its offset within a corresponding object. In a particularly embodiment, each TOC entry includes 64 bytes of information, while each FTL map entry includes 64 bits of information describing a corresponding TOC entry.

Much of the detailed information from a TOC entry may be elided from the in-core FTL map, as the information is redundant and/or can be derived from other sources. For example, there is no need for each entry in a per-object map to contain the object ID, as that the object ID would be the same for each entry. In addition, an entry's location in the FTL map can be used to derive the offset it represents, so there is no need to actually store the offset in the map. In one particular embodiment, each 64-byte TOC entry may be represented by a 64-bit map entry, where the only information explicitly kept in the FTL map is the frag's location in persistent storage.

Note that in this example for the illustration purpose only, storage module 110 includes flash memory devices or other solid state memory devices and a file system utilized herein is part of a flash file system. Accordingly, FTL maps 130A-130B may be constructed and utilized according to the FTL specification well known in the art. However, the techniques described throughout this application can also be applied to other persistent storage devices and/or other file systems. Thus, maps 130A-130B may be implemented in accordance with their respective specifications.

According to one embodiment, when client 101 writes a frag to storage module 110, CM 102A will receive the frag in CM memory 105A. The frag is incorporated into an opened data page and eventually stored in persistent memory region 122A as part of data pages 132A. Based on the frag, CM 102A constructs a new TOC entry fully describing the newly received frag. CM 102A then incorporates or inserts the new TOC entry in a currently open TOC page 115A. CM 102A then updates the in-memory FTL map with the summary information for the new TOC entry. TOC 115A may be part of a currently opened block which may also be maintained in RAM region 121A and/or optionally in CM memory 105A. If there is no TOC page currently opened in CM memory 105A, CM 102A may initiate or open a new TOC page. In one embodiment, a TOC page can contain a predetermined number of TOC entries. Similarly, a block can contain a combination of a predetermined number of data pages and a predetermined number of TOC pages. The size of a block depends on a size of an erasure unit associated with a type of underlining flash memory devices. The above operations may be iteratively performed for each frag received from client 101 to fulfill a currently opened TOC page and/or block.

When a TOC page is full (e.g., containing a predetermined number of TOC entries), CM 102A incorporates the TOC page into a currently opened block and opens a new TOC page in RAM region 121A. RAM region 121A may also maintain a copy of the currently opened block (not shown), which may be periodically synchronized with the block maintained in CM memory 105A. When the open block is full, the block is then written from RAM region 121A to persistent memory region 122A. The block may also be flushed from RAM region 121A to persistent memory region 122A in response to a predetermined event notification (e.g., a power failure notification). Once a block has been written to persistent memory region 122A, CM 102A allocates or opens a new block with a new TOC 115A in RAM region 121A and/or CM memory 105A for subsequent frags received from client 101.

In addition, according to one embodiment, when a TOC page is full in CM memory 105A and/or in RAM region 121A, CM 102A transmits a control signal to CM 102B via inter-processor link 106 to indicate that a full TOC page is available in RAM region 121A to allow or instruct CM 102B to update its FTL map 130B maintained in CM memory 105B. The control signal may further indicate where the new full TOC page is located within RAM region 121A. In response to the control signal, CM 102B copies (e.g., via storage module controller 120) the TOC page from RAM region 121A and loads it into CM memory 105B, for example, as part of TOC page 115B. CM 102B examines the TOC entries of TOC page 115B and updates the TOC entries into its FTL map 130B. In one embodiment, once TOC page 115B has been loaded into CM memory 105B from RAM region 121A, CM 102B acknowledges or responds to the control signal received from CM 102A via inter-processor link 106. CM 102B then processes TOC page 115B to update FTL map 130B. In this embodiment, inter-processor link 106 operates as a control path, while storage module 110 shared by CMs 102A-102B operates as a data path.

As a result, since CMs 102A-102B share storage module 110 via a high-speed communication fabric, CM 102B can simply copy the TOC pages created by CM 102A via storage module 110 without having to construct the same TOC page by itself. In a conventional system, for each TOC entry created by CM 102A, CM 102A has to send the TOC entry to CM 102B (e.g., via inter-processor link 106), which may cause a significant amount of traffic between CMs 102A-102B. In addition, in the conventional system, CM 102A has to wait for an acknowledgment from CM 102B indicating that CM 102B has synchronized the FTL map, before returning a status or acknowledgment back to client 101, which causes unnecessary latency. In one embodiment, as soon as a new TOC page or a new TOC entry has been constructed by CM 102A and stored in RAM region 121A, CM 102A can acknowledge or return a status back to client 101. CM 102A can process a subsequent frag received from client 101, while CM 102B synchronizes its FTL map 130B (when the TOC page is full) from RAM region 121A in parallel. Note that the description set forth above can be similarly applicable to write requests received by CM 102B from client 101, where information of FTL map 130B is synchronized by CM 102A.

Figure 2:
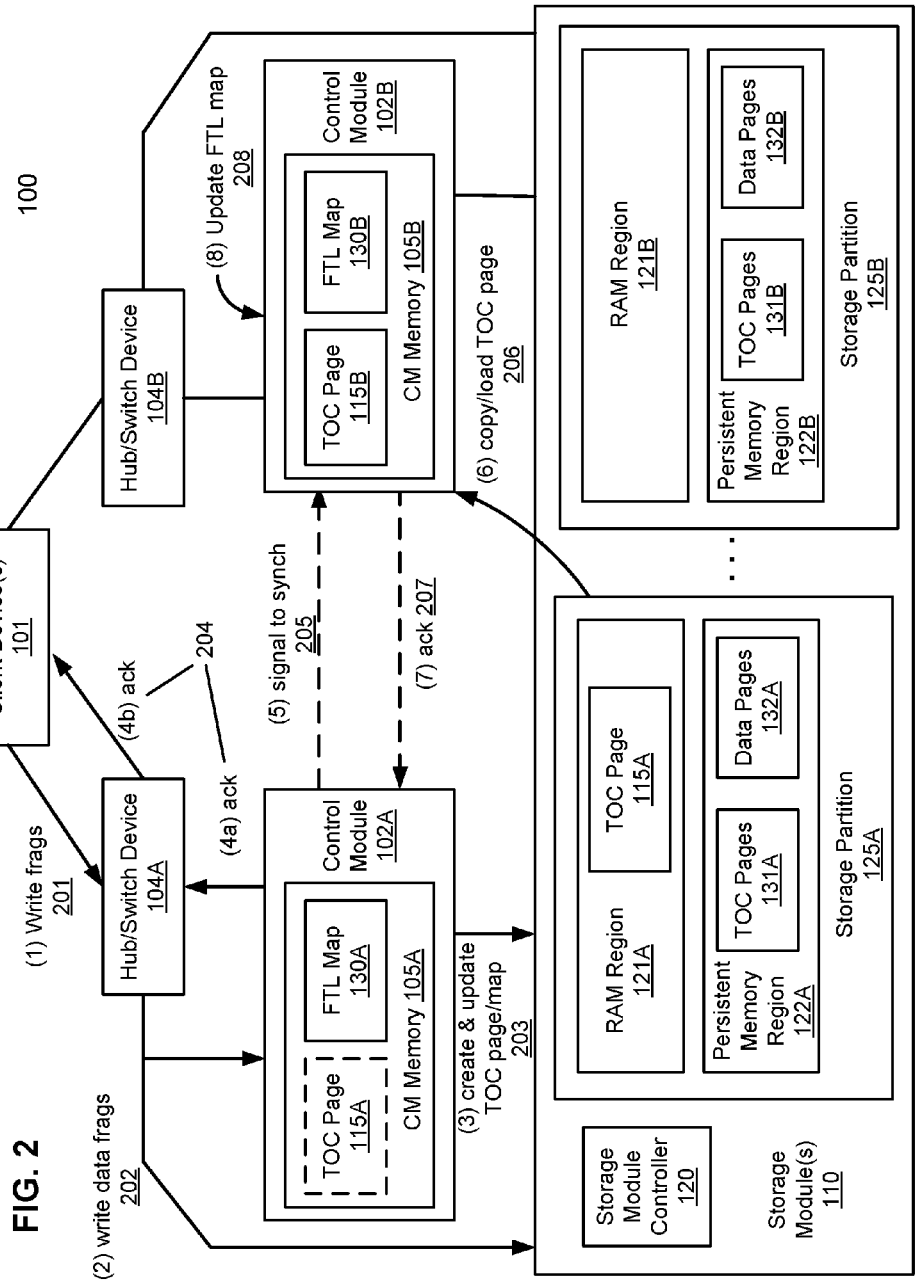
FIG. 2 is a block diagram illustrating a processing flow of writing data fragments in a storage system according to one embodiment of the invention.

FIG. 2 is a block diagram illustrating a processing flow of writing data fragments in a storage system according to one embodiment of the invention. Referring to FIG. 2, when client 101 writes a frag to storage module 110, it sends the frag to hub/switch device 104A via path 201. In response, hub/switch device 104A sends the frag to CM memory 105A and/or storage module 110 via path 202 over the communication fabric. In one embodiment, hub/switch device 104A may be programmed to send the data frag to both CM memory 105A and storage module 110 using a DMA transaction. In a particular embodiment, hub/switch device 104A may be programmed to multicast the same data frag to CM memory 105A and RAM region 121A. The multicast operation will be described in details further below.

In response to the frag received at CM memory 105A, according to one embodiment, CM 102A is configured to construct a new TOC entry in an open TOC page and incorporate the frag into an open data page via path 203. The open TOC page and the open data page may be a part of an open block to be stored in storage module 110 subsequently, for example, when the open TOC page and the open data block are full. The above operations involved in paths 201-203 may be iteratively performed for each frag written by client 101.

In one embodiment, after a new TOC entry has been created, CM 102A can acknowledge or return a status of the write operation back to client 101 via path 204. In addition, CM 102A examines the corresponding open TOC page to determine whether the TOC page is full. That is, CM 102A examines the TOC page to determine whether the TOC page contains a predetermined number of TOC entries. If the TOC page is full, CM 102A sends a control signal to CM 102B using inter-processor link 106 via path 205. The control signal may indicates that a new TOC page is available at a particular storage location of RAM region 121A.

In response to the control signal received via path 205, CM 102B copies and loads (e.g., via storage module controller 120) the TOC page from RAM region 121A to CM memory 105B. In one embodiment, once the TOC page has been copied and loaded into CM memory 105B, CM 102B can acknowledge or respond to the control signal via path 207, such that CM 102A can release the memory resource holding the TOC page 115A in RAM region 121A. CM 102B then processes the TOC entries of TOC page 115B to update its FTL map 130B. Thus, by copying a TOC page that was created by CM 102A, CM 102B does not have to construct the same TOC page for the purpose of updating FTL map 130B. In addition, by storing the TOC page in RAM region 121A, CM 102A can acknowledges the write operation to client 101 without having to wait for CM 102B to synchronize an individual TOC entry.

Figure 3A:
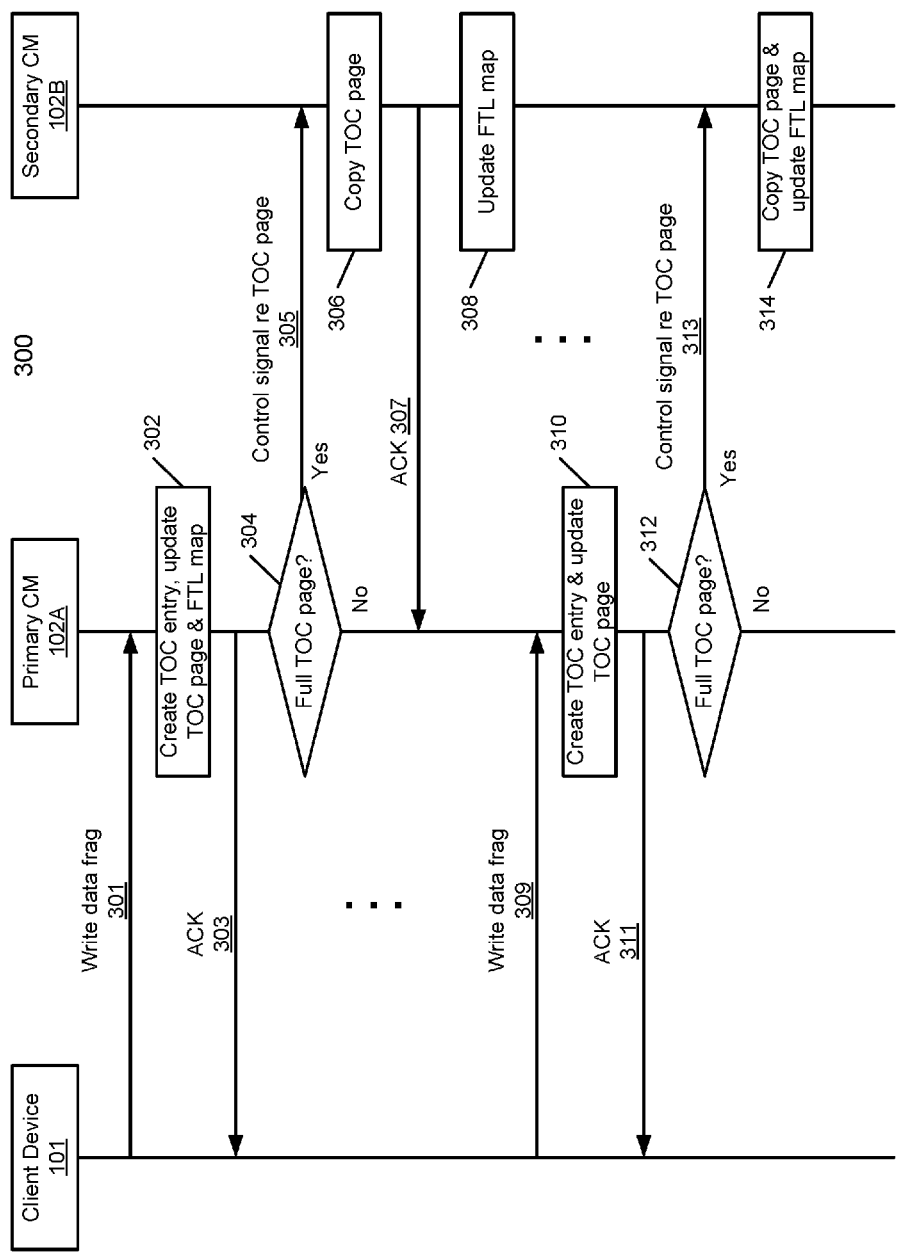
FIGS. 3A-3B are flow diagrams illustrating examples of processes for writing data fragments in a storage system according to certain embodiments of the invention.

FIG. 3A is a processing flow diagram illustrating a process for storing data in a storage system according to one embodiment of the invention. Process 300 may be performed by the storage systems as shown in FIG. 1 and FIG. 2. Referring to FIG. 3A, at transaction 301, client 101 sends a frag to CM 102A to be written to a storage module. In response, at block 302, CM 102A creates a new TOC entry and updates an open TOC page. CM 102A then acknowledges the write request via transaction 303. At block 304, CM 102A examines the open TOC page to determine whether the open TOC page is full (e.g., containing a predetermined number of TOC entries). If so, at transaction 305, CM 102A sends a control signal via an inter-processor link to CM 102B. In response to the control signal CM 102B copies the new TOC page created by CM 102A from the memory location in storage partition 125A into its own memory. CM 102B acknowledges the control signal via transaction 307 to indicate that the TOC page has been copied, such that CM 102A can release the memory holding the TOC page. At block 308, CM 102B examines TOC entries of the TOC page and updates its FTL map based on the TOC entries. The above operations may be iteratively performed as part of operations involved in transactions 309-314, until an open block is full in which the full block is then written to a persistent storage device.

Figure 3B:
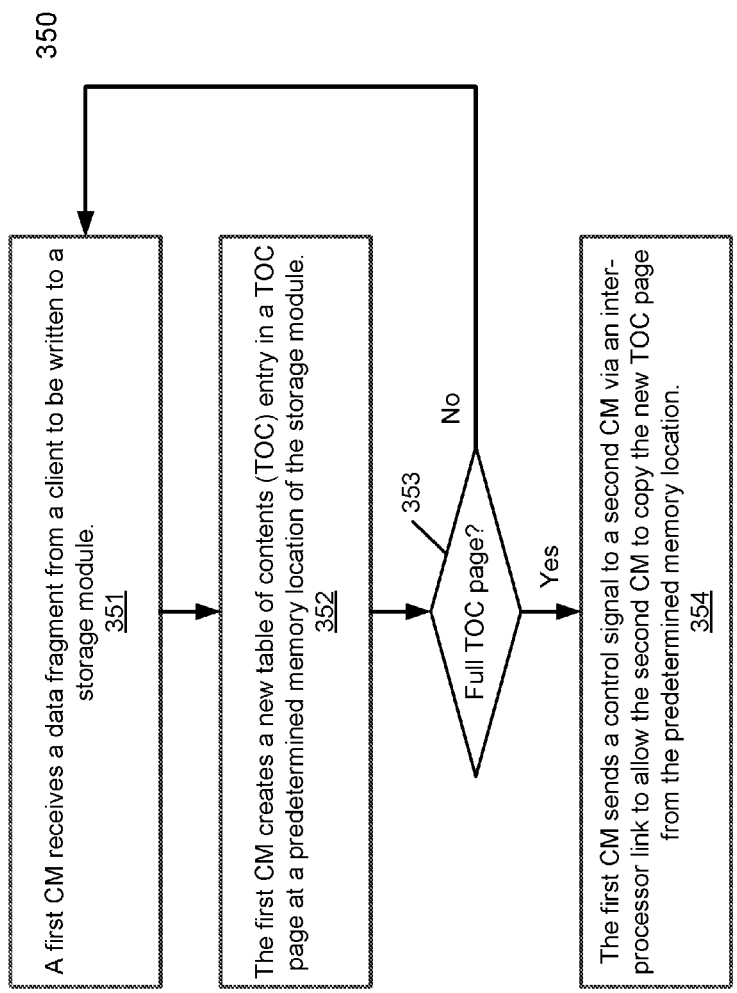

FIG. 3B is a flow diagram illustrating a process for storing data in a storage system according to one embodiment of the invention. Process 350 may be performed by a primary CM, such as CM 102A described above. Referring to FIG. 350, at block 351, a first CM receives a frag from a client device to be written to a storage module. At block 352, the first CM creates a new TOC entry in an open TOC page (e.g., in-memory data structure representing a TOC page). At block 353, the first CM examines the TOC page to determine whether the TOC page is full (e.g., containing a predetermined number of TOC entries). If the TOC page is full, at block 354, the first CM sends a control signal to the second CM via an inter-processor link to allow the second CM to copy the new TOC page from the predetermined memory location.

FIG. 4A shows a storage module according to one embodiment. The storage module may represent any of the storage modules described above, such as storage module 110. Referring to FIG. 4A, persistent storage 400 includes one or more blocks. Persistent storage 400 may be a solid state storage (e.g., a flash memory device). A block is the smallest erasable unit of storage within persistent storage 400. FIG. 4B shows a block according to one embodiment. More specifically, each block 402 includes one or more pages. In one embodiment, a page is the smallest addressable unit for read and program operations (including the initial writing to a page) in persistent storage 400. In one embodiment, rewriting a page within a block requires the entire block to be erased and rewritten. In one embodiment, each page within a block is either a data page as shown in FIG. 4C or a TOC page as shown in FIG. 4D.

FIG. 4C shows a data page 404 according to one embodiment. The data page 404 includes one or more frags. A frag corresponds to a finite amount of user data. Further, the frags within a given page may be of a uniform size or of a non-uniform size. Further, frags within a given block may be of a uniform size or of a non-uniform size. A data page only includes frags. Each frag includes user data (i.e., data provided by the client for storage in the storage appliance). For purposes of this description, the term "frag" and "user data" are used interchangeably.

FIG. 4D shows a TOC page according to one embodiment. The TOC page 406 includes one or more TOC entries, where each of the TOC entries includes metadata describing a corresponding frag. In addition, the TOC page 406 may include a reference to another TOC page in the block 402. In one embodiment, a TOC page only includes TOC entries (and, optionally, a reference to another TOC page in the same block), but does not include any frags. Each TOC entry corresponds to or describes a frag (see FIG. 4C) in the block 402. The TOC entries only correspond to frags within the same block. That is, a TOC page is associated with a block and only includes TOC entries for frags in that block. The last page that is not defective in each block within each of the solid state storage is a TOC page.

FIG. 4E shows a block according to one embodiment. More specifically, FIG. 4E shows a block (408) that includes TOC pages 414, 418, and 426 and data pages 410, 412, 416, 420, 422, and 424. For the purpose of illustration, block 408 is conceptually filled from "top" to "bottom." Further, TOC pages are generated and stored once the accumulated size of the TOC entries for the frags in the data pages equal the size of a page. Referring to FIG. 4E, for example, data page 410 and data page 412 are stored in the block 408. The corresponding TOC entries (not shown) for the frags (not shown) in data page 410 and data page 412 have a total cumulative size equal to the size of a page in the block. Accordingly, a TOC page 414 is generated (using the TOC entries corresponding to frags in the block) and stored in the block 408. Frag page 416 is subsequently written to the block 408. Because the TOC entries corresponding to the frags (not shown) in data page 416 have a total cumulative size equal to the size of a page in the block, TOC page 418 is created and stored in the block 408. Further, because there is already a TOC page in the block 408, TOC page 418 also includes a reference to TOC page 414.

This process is repeatedly performed until there is only one page remaining in the block 408 to fill. At this point, a TOC page 426 is created and stored in the last page of the block 408. Those skilled in the art will appreciate that the total cumulative size of the TOC entries in the TOC page 426 may be less than the size of the page. In such cases, the TOC page may include padding to address the difference between the cumulative size of the TOC entries and the page size. Finally, because there are other TOC pages in the block 408, TOC page 426 includes a reference to one other TOC page 418.

As shown in FIG. 4E, the TOC pages are linked from the "bottom" of the block to "top" of the page, such that the TOC page may be obtained by following a reference from a TOC page that is below the TOC page. For example, TOC page 418 may be accessed using the reference in TOC page 426. Those skilled in the art will appreciate that while block 408 only includes data pages and TOC pages, block 408 may include pages (e.g., a page that includes parity data) other than data pages and TOC pages without departing from the technology. Such other pages may be located within the block and, depending on the implementation, interleaved between the TOC pages and the data pages.

FIG. 4F shows a TOC entry according to one embodiment. Each TOC entry includes metadata for a frag (and in particular the user data in the frag) and may include one or more of the following fields: an object ID, which identifies the object (e.g., file) being stored; the birth time, which specifies the time (e.g., the processor clock value of the processor in the control module) at which the frag corresponding to the TOC entry was written to the vaulted memory; an offset ID, which identifies the starting point of the user data in the frag relative to the beginning of the object (identified by the object ID); a fragment size, which specifies the size of the frag; a page ID, which identifies the page in the block in which the frag is stored; byte, which identifies the starting location of the frag in the page (identified by the page ID); logical length, which specifies the non-compressed length of the user data in the frag; a type, which specifies the type of user data in the frag (e.g., bad page, data, snapshot, pool); kind, which specifies whether the frag is valid user data or trim (which indicates that the frag may be erased when the solid state storage performs garbage collection); and reserved, which corresponds to space in the TOC entry that may be used to store other user data.

In one embodiment, the <object ID, offset ID> or <object ID, offset ID, birth time> identify user data that is provided by the client. Further, the <object ID, offset ID> or <object ID, offset ID, birth time> are used by the client to identify particular user data, while the storage appliance uses a physical address(es) to identify user data within the storage appliance. Those skilled in the art will appreciate that the client may provide a logical address instead of the object ID and offset ID. Those skilled in the art will appreciate that a TOC entry may include additional or fewer fields. Further, the fields in the TOC entry may be arranged in a different order and/or combined. In addition, while the fields in the TOC entry shown in FIG. 4F appear to all be of the same size, the size of various fields in the TOC entry may be non-uniform, with the size of any given field varying based on the implementation of the TOC entry.

Figure 5A:
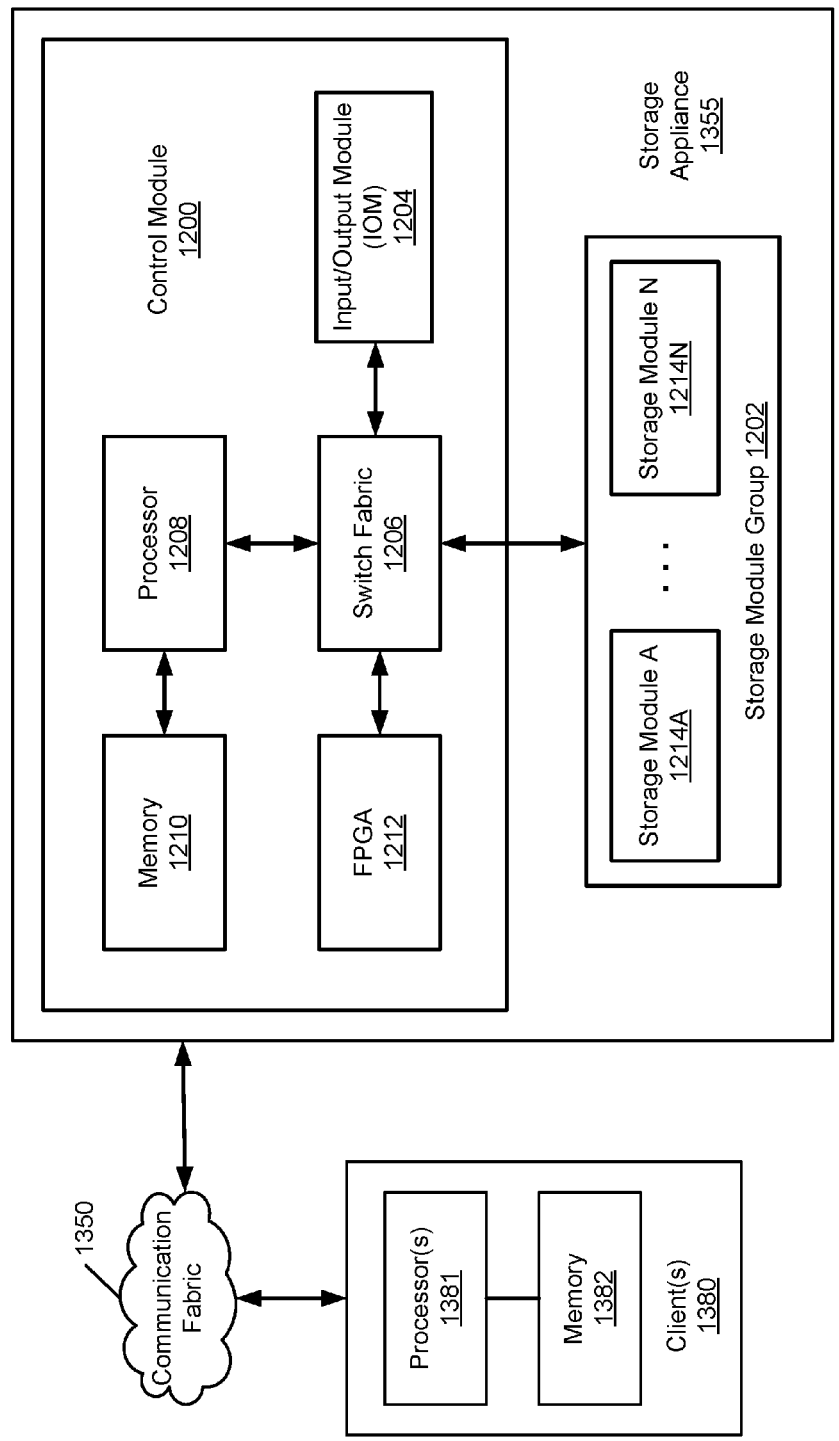
FIGS. 5A-5D are block diagrams illustrating examples of a storage appliance according to certain embodiments of the invention.

FIGS. 5A-5D are block diagrams illustrating examples of a storage appliance according to certain embodiments of the invention. The storage appliance may represent a storage appliance described above. Referring to FIG. 5A, the storage appliance includes a control module 1200 and a storage module group 1202. Control module 1200 may represent any of the control modules described above. In one embodiment, control module 1200 is configured to manage the servicing of read and write requests from one or more clients or client devices 1380. A client herein may represent any of the clients or client devices described above. In one embodiment, control module 1200 is configured to receive requests from one or more clients 1380 via a communication fabric 1350, to process the requests (which may include sending the requests to a storage module), and to provide a response to client 1380 after the request has been serviced.

In one embodiment, control module 1200 includes an Input/Output Module (IOM) 1204, a switch fabric 1206, a processor 1208, a memory 1210, and, optionally, a Field Programmable Gate Array (FPGA) 1212. In one embodiment, IOM 1204 is the physical interface between the clients and the other components in the storage appliance. The IOM 1204 supports a variety of communication protocols, such as, for example, PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE).

In one embodiment, switch fabric 1206 includes one or more interconnected switches. If switch fabric 1206 includes multiple switches, each switch may be connected to every other switch, may be connected to a subset of switches in the switch fabric, or may only be connected to one other switch in the switch fabric. In one embodiment, each of the switches in switch fabric 1206 is a combination of hardware and logic (implemented, for example, using integrated circuits) (as defined by the protocol(s) the switch fabric implements) that is configured to connect various components together in the storage appliance and to route packets (using the logic) between the various connected components. In one embodiment, switch fabric 1206 is physically connected to IOM 1204, processor 1208, storage module group 1202, and, if present, FPGA 1212. In one embodiment, all inter-component communication in control module 1200 (except between the processor 1208 and memory 1210) passes through switch fabric 1206. Further, all communication between control module 1200 and storage module group 1202 passes through the switch fabric 1206. In one embodiment, switch fabric 1206 is implemented using a PCI protocol (e.g., PCI, PCIe, PCI-X, or another PCI protocol). In such embodiments, all communication that passes through switch fabric 1206 uses the corresponding PCI protocol.

In one embodiment, if switch fabric 1206 implements a PCI protocol, switch fabric 1206 includes a port for the processor (or, more specifically, a port for the root complex integrated in processor 1208 or for the root complex connected to the processor), one or more ports for storage modules 1214A to 1214N in storage module group 1202, a port for the FPGA 1212 (if present), and a port for IOM 1204. Each of storage modules 1214A01214N may represent any of the storage modules described above. In one embodiment, each of the aforementioned ports may be configured as a transparent bridge or a non-transparent bridge. Those skilled in the art will appreciate that while switch fabric 1206 has been described with respect to a PCI implementation, switch fabric 1206 may be implemented using other protocols without departing from embodiments of the invention.

In one embodiment, at least one switch in switch fabric 1206 is configured to implement multicasting. More specifically, in one embodiment, processor 1208 is configured to generate a multicast group where the multicast group includes two or more members with each member specifying an address in memory 1210 and/or in storage modules 1214A-1214N. When the multicast group is created, the multicast group is associated with a multicast address. In order to implement the multicasting, at least one switch in the switch fabric is configured that when a write specifying the multicast address as the destination address is received, the switch is configured to generate a new write for each member in the multicast group and issue the writes to the appropriate address in the storage appliance. In one embodiment, the address for each write generated by the switch is determined by adding a particular offset to the multicast address.

Processor 1208 may be a group of electronic circuits with a single core or multiple cores that are configured to execute instructions. In one embodiment, processor 1208 may be implemented using a Complex Instruction Set (CISC) Architecture or a Reduced Instruction Set (RISC) Architecture. In one embodiment, processor 1208 includes a root complex (as defined by the PCIe protocol). In one embodiment, if control module 1200 includes a root complex (which may be integrated into processor 1208) then memory 1210 is connected or coupled to processor 1208 via the root complex. Alternatively, memory 1210 is directly connected to processor 1208 using a point-to-point connection mechanism. In one embodiment, memory 1210 may be any volatile memory including, but not limited to, Dynamic Random-Access Memory (DRAM), Synchronous DRAM, SDR SDRAM, and DDR SDRAM.

In one embodiment, processor 1208 is configured to create and update an in-memory data structure (not shown), where the in-memory data structure is stored in memory 1210. In one embodiment, the in-memory data structure includes mappings (direct or indirect) between logical addresses and physical storage addresses in the set of storage modules. In one embodiment, the logical address is an address at which the data appears to reside from the perspective of the client. In one embodiment, the logical address is (or includes) a hash value generated by applying a hash function (e.g. SHA-1, MD-5, etc.) to an n-tuple. In one embodiment, the n-tuple is <object ID, offset ID>, where the object ID defines a file and the offset ID defines a location relative to the starting address of the file. In another embodiment of the technology, the n-tuple is <object ID, offset ID, birth time>, where the birth time corresponds to the time when the file (identified using the object ID) was created. Alternatively, the logical address may include a logical object ID and a logical byte address, or a logical object ID and a logical address offset. In another embodiment of the technology, the logical address includes an object ID and an offset ID. Those skilled in the art will appreciate that multiple logical addresses may be mapped to a single physical address and that the logical address is not limited to the above embodiments.

In one embodiment, the physical address may correspond to (i) a location in memory 1210, (ii) a location in the vaulted memory, or (iii) a location in a solid state memory module. In one embodiment, the in-memory data structure may map a single hash value to multiple physical addresses if there are multiple copies of the data in the storage appliance.

In one embodiment, memory 1210 includes one or more of the following: a submission queue for processor 1208, a completion queue for processor 1208, a submission queue for each of the storage modules 1214A-1214N in the storage appliance, and a completion queue for each of storage modules 1214A-1214N in the storage appliance. In one embodiment, the submission queue for processor 1208 is used to send commands (e.g., read request, write request) to processor 1208. In one embodiment, the completion queue for processor 1208 is used to signal processor 1208 that a command it issued to another entity has been completed. The submission and completion queues for the storage modules function in a similar manner.

In one embodiment, processor 1208 (via the switch fabric) is configured to offload various types of processing to FPGA 1212. In one embodiment, FPGA 1212 includes functionality to calculate checksums for data that is being written to the storage module(s) and/or data that is being read from the storage module(s). Further, FPGA 1212 may include functionality to calculate P and/or Q parity information for purposes of storing data in the storage module(s) using a RAID scheme (e.g., RAID 2-RAID 6) and/or functionality to perform various calculations necessary to recover corrupted data stored using a RAID scheme (e.g., RAID 2-RAID 6). In one embodiment, storage module group 1202 includes one or more storage modules (1214A-1214N) each configured to store data.

In one embodiment, processor 1208 is configured to program one or more DMA engines in the system. For example, processor 1208 is configured to program the DMA engine in the client switch. Processor 1208 may also be configured to program the DMA engine in the storage module. In one embodiment, programming a DMA engine in the client switch may include creating a multicast group and generating descriptors for each of the members in the multicast group.

In one embodiment, communication fabric 1350 can be any of high speed communication fabrics, such as, for example, a PCTe, Ethernet, Fabre channel, or Infiniband™ fabric. Client 1380 may be any system that includes functionality to issue a read request to a storage appliance and/or issue a write request to the storage appliance. Client 1380 may include a client processor 1381 and client memory 1382. In one embodiment client 1380 is configured to communicate with storage appliance 1355 using a variety of communication protocols, such as, Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric.

In one embodiment, if client 1380 implements PCI, PCI-express, or NVMe, client 1380 may include a root complex (not shown). A root complex is a device that connects client 1380 (including its client processor and client memory) to the PCIe Fabric. In one embodiment, the PCIe Fabric includes root complexes and endpoints which are connected via switches. An endpoint is a device other than a root complex or a switch that can originate PCI transactions (e.g., read request, write request) or that is a target of PCI transactions. One or more clients and one or more storage appliances may be integrated as part of a PCIe fabric. Further, if the individual components within the storage appliance communicate using PCIe and individual components in client 1380 communicate using PCIe, then all the components in the storage appliance and client 1380 may be considered part of a single PCIe Fabric.

The client memory 1382 may include a submission queue (SQ) for the client processor and a completion queue (CQ) for the client processor. In one embodiment of the invention, the storage appliance memory, such as memory devices 1210 include one or more submission queues for client processors visible to a client through the communication fabric. The client memory 1382 includes one or more completion queues for the client processor visible to the storage appliance through the communication fabric. The submission queue for the client processor is used to send commands (e.g., read request, write request) to the client processor. The completion queue for the client processor is used to signal the client processor that a command it issued to another entity has been completed.

Client 1380 may further include a client switch to couple client 1380 to the communication fabric, where the client switch may include one or more switch devices. If the client switch includes multiple switches, each switch may be connected to every other switch, may be connected to a subset of the switches in the switch fabric, or may only be connected to one other switch. In one embodiment of the invention, each of the switches in the client switch is a combination of hardware and logic configured to permit data and messages to be transferred between the client 1380 and the storage appliances 1355.

In such embodiments, a client switch may include one or more ports, where each port may be configured as a transparent bridge or a non-transparent bridge. Ports implemented as transparent bridges allow the root complex to continue discovery of devices (which may be other root complexes, switches, PCI bridges, or endpoints) connected (directly or indirectly) to the port. In contrast, when a root complex encounters a port implemented as a non-transparent bridge, the root complex is not able to continue discovery of devices connected to the port—rather, the root complex treats such a port as an endpoint.

When a port is implemented as a non-transparent bridge, devices on either side of the non-transparent bridge may only communicate using a mailbox system and doorbell interrupts (implemented by the client switch). The doorbell interrupts allow a processor on one side of the non-transparent bridge to issue an interrupt to a processor on the other side of the non-transparent bridge. Further, the mailbox system includes one or more registers that are readable and writeable by processors on either side of the switch fabric. The aforementioned registers enable processors on either side of the client switch to pass control and status information across the non-transparent bridge.

In order to send a PCI transaction from a device on one side of the non-transparent bridge to a device on the other side of the non-transparent bridge, the PCI transaction must be addressed to the port implementing the non-transparent bridge. Upon receipt of the PCI transaction, the client switch performs an address translation (either using a direct address translation mechanism or a look-up table based translation mechanism). The resulting address is then used to route the packet towards the appropriate device on the other side of the non-transparent bridge.

The client switch is configured such that at least a portion of the client memory is directly accessible to the storage appliance. That is, a storage appliance on one side of the client switch may directly access, via the client switch, client memory on the other side of the client switch. The client switch may include a DMA engine programmed by either the client processor or a storage appliance connected to the client switch. The DMA engine may be programmed to read data from an address in the portion of the client memory that is accessible to the storage appliance and directly write a copy of such data to memory in the storage appliance or storage modules. Further, the DMA engine may be programmed to read data from the storage appliance and directly write a copy of such data to an address in the portion of the client memory that is accessible to the storage appliance.

In one embodiment of the invention, the DMA engine supports multicasting. In such embodiments, a processor in the storage appliance may create a multicast group, where each member of the multicast group corresponds to a unique destination address in memory on the storage appliance. Each member of the multicast group is associated with a descriptor that specifies: (i) the destination address; (ii) the source address; (iii) the transfer size field; and (iv) a control field. The source address for each of the descriptors remains constant while the destination address changes for each descriptor. Once the multicast group is created, any data transfer through the switch targeting the multicast group address, including a transfer initiated by a DMA engine, places an identical copy of the data in all of the destination ports associated with the multicast group. The switch processes all of the multicast group descriptors in parallel.

Figure 5B:
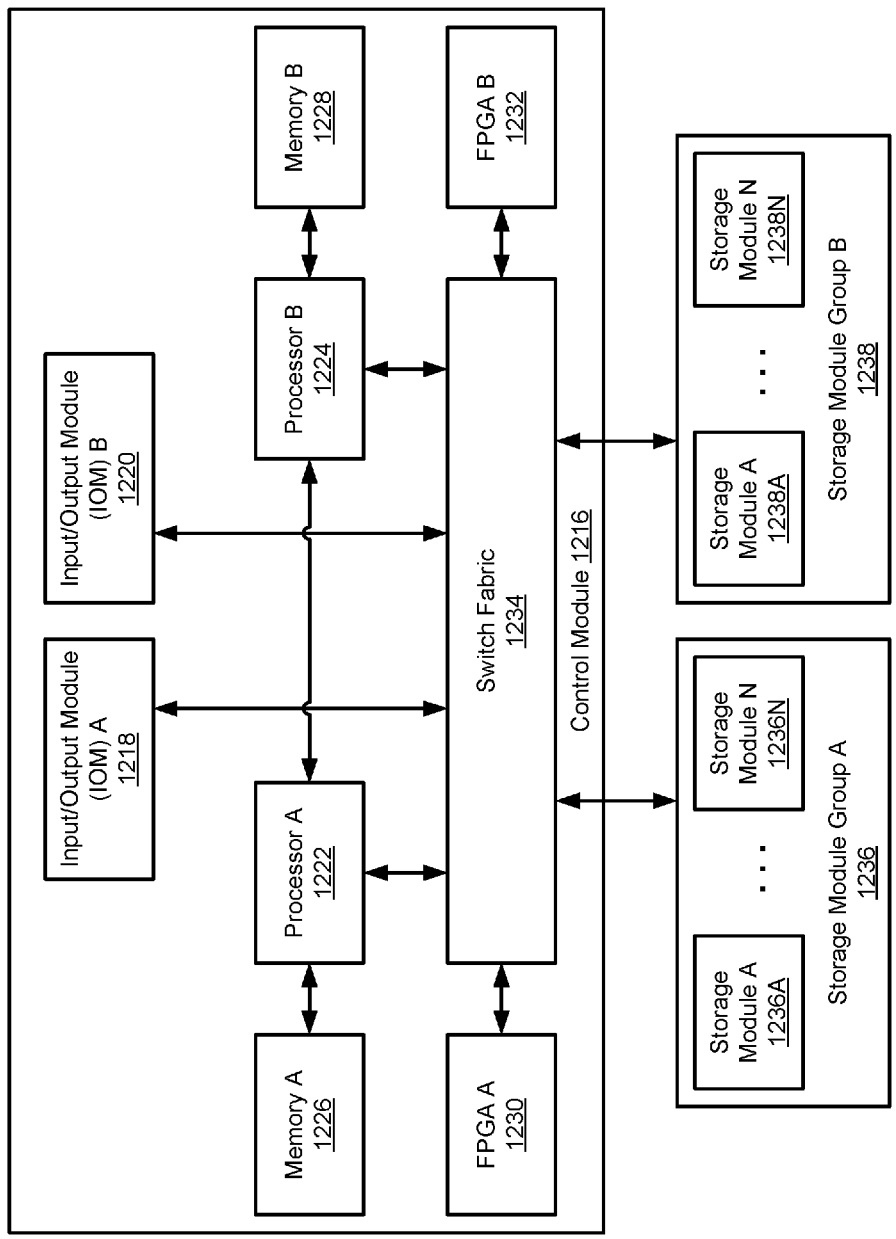

Referring now to FIG. 5B, according to another embodiment, a storage appliance includes a control module 1216 and at least two storage module groups 1236 and 1238. Control module 1216 includes a switch fabric 1234, which is directly connected to IOM A 1218, IOM B 1220, processor A 1222, processor B 1224, (if present) FPGA A 1230, (if present) FPGA B 1232, storage modules 1236A-1236N in storage module group A 1236 and storage modules 1238A-1238N in storage module group B 1238. All communication between the aforementioned components (except between processor A 1222 and processor B 1224) passes through switch fabric 1234. In one embodiment of the technology, processors 1222 and 1224 within control module 1216 are able to directly communicate using, for example, point-to-point interconnect such as Intel® QuickPath Interconnect.

In one embodiment, the two IOMs 1218 and 1220 in control module 1216 double the I/O bandwidth for control module 1216 (over the I/O bandwidth of a control module with a single IOM). Moreover, the addition of a second IOM (or additional IOMs) increases the number of clients that may be connected to a given control module and, by extension, the number of clients that can be connected to a storage appliance. In one embodiment, the use of switch fabric 1234 to handle communication between the various connected components (described above) allows each of processors 1222 and 1224 to directly access (via the switch fabric 1234) all FPGAs 1230 and 1232 and all storage modules (1236A-1236N, 1238A-1238N connected to switch fabric 1234.

Figure 5C:
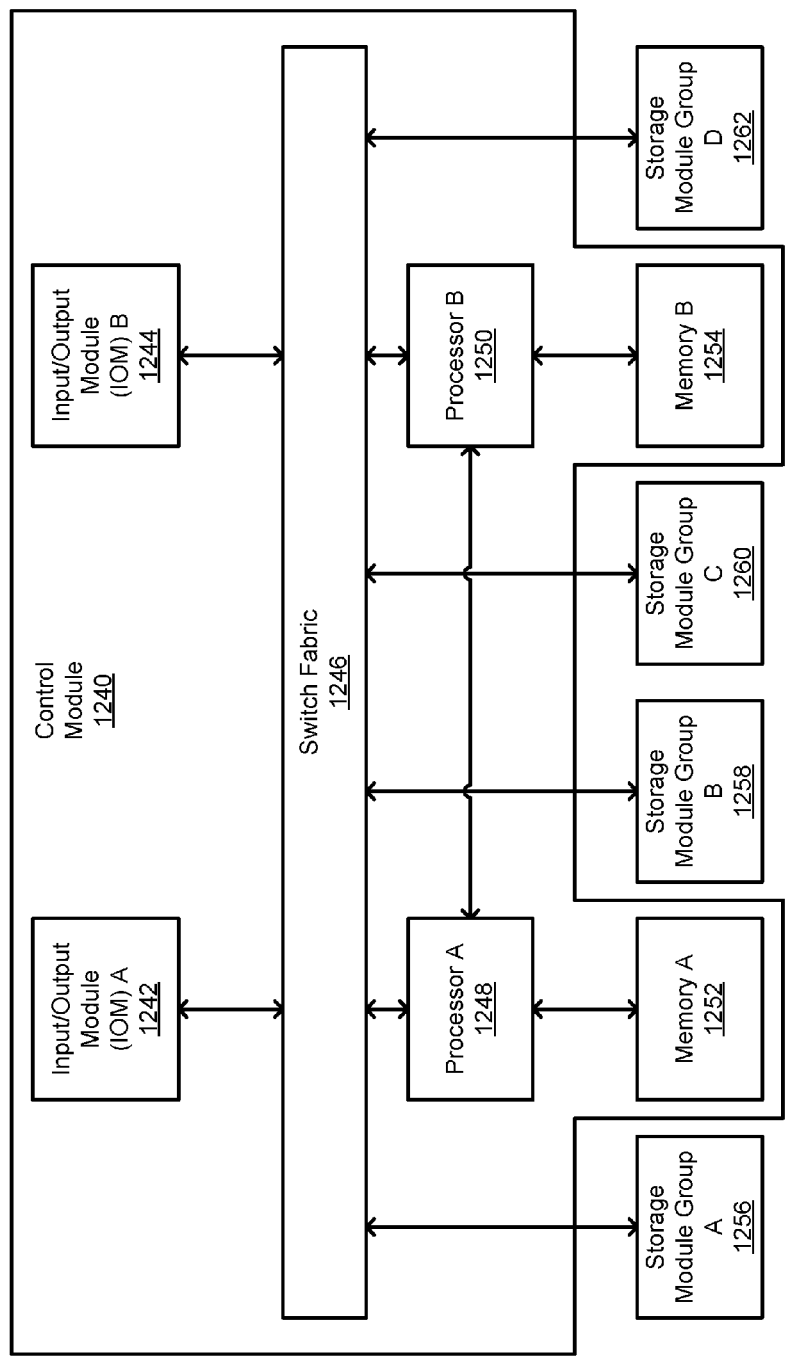

Referring to FIG. 5C, according to another embodiment, a storage appliance includes a control module 1240 connected (via a switch fabric 1246) to multiple storage modules (not shown) in the storage module groups (1256, 1258, 1260, 1262). Control module 1240 includes two IOMs (1242, 1244), two processors (1248, 1250), and memory (1252, 1254). In one embodiment, all components in control module 1240 communicate via switch fabric 1246. The operations of these components are similar to the operations described above.

In one embodiment, processor A 1248 is configured to primarily handle requests related to the storage and retrieval of data from storage module groups A and B (1256, 1258) while processor B 1250 is configured to primarily handle requests related to the storage and retrieval of data from storage module groups C and D (1260, 1262). However, the processors (1248, 1250) are configured to communicate (via the switch fabric 1246) with all of the storage module groups (1256, 1258, 1260, 1262). This configuration enables control module 1240 to spread the processing of I/O requests between the processors and/or provides built-in redundancy to handle the scenario in which one of the processors fails.

Figure 5D:
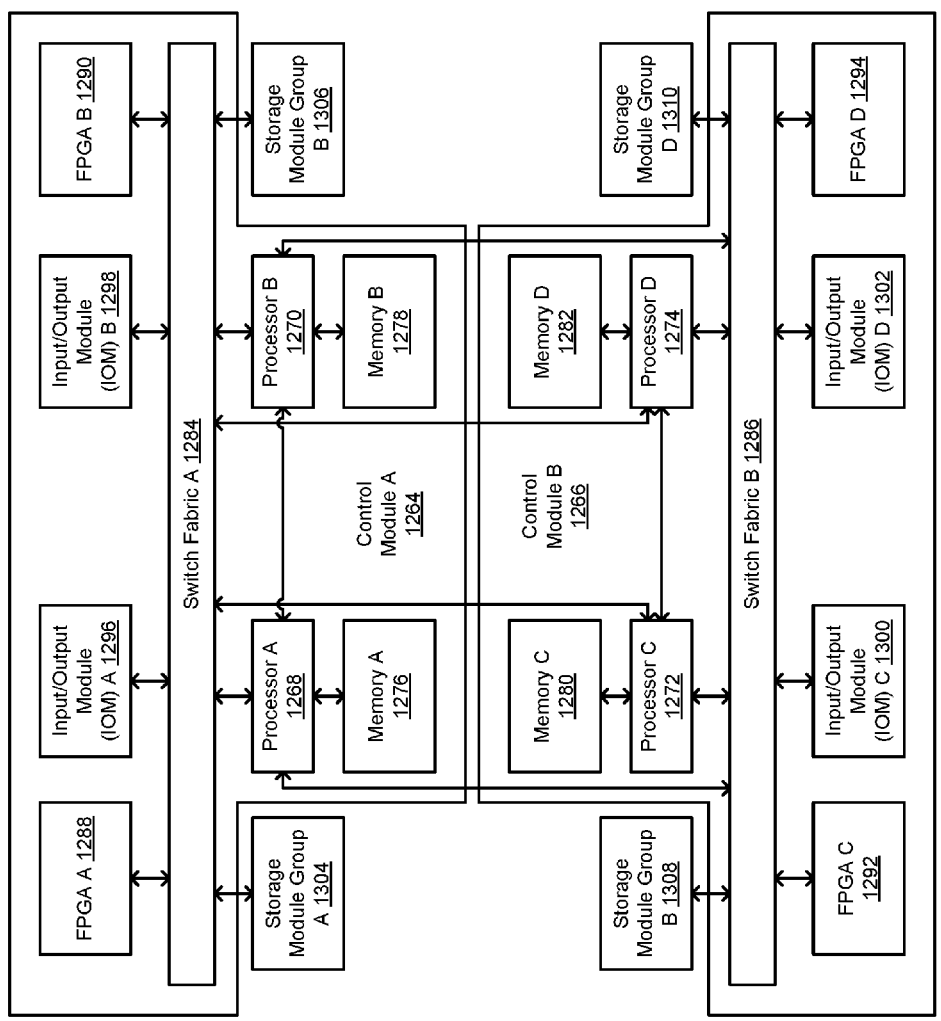

Referring to FIG. 5D, according to another embodiment, a storage appliance includes two control modules (1264, 1266). Each control module includes IOMs (1296, 1298, 1300, 1302), processors (1268, 1270, 1272, 1274), memory (1276, 1278, 1280, 1282), and FPGAs (if present) (1288, 1290, 1292, 1294). Each of the control modules (1264, 1266) includes a switch fabric (1284, 1286) through which components within the control modules communicate.

In one embodiment, processors (1268, 1270, 1272, 1274) within a control module may directly communicate with each other using, for example, a point-to-point interconnect such as Intel® QuickPath Interconnect. In addition, processors (1268, 1270) in control module A may communicate with components in control module B via a direct connection to the switch fabric (1286) in control module B. Similarly, processors (1272, 1274) in control module B may communicate with components in control module A via a direct connection to the switch fabric (1284) in control module A.

In one embodiment, each of the control modules is connected to various storage modules (denoted by storage module groups (1304, 1306, 1308, 1310)). Each control module may communicate with storage modules connected to the switch fabric in the control module. Further, processors in control module A (1264) may communicate with storage modules connected to control module B (266) using switch fabric B (1286). Similarly, processors in control module B (1266) may communicate with storage modules connected to control module A (1264) using switch fabric A (1284).

The interconnection between the control modules allows the storage control to distribute I/O load across the storage appliance regardless of which control module receives the I/O request. Further, the interconnection of control modules enables the storage appliance to process a larger number of I/O requests. Moreover, the interconnection of control modules provides built-in redundancy in the event that a control module (or one or more components therein) fails.

In one embodiment, the in-memory data structure is mirrored across the memories in the control modules. In such cases, the processors in the control modules issue the necessary commands to update all memories within the storage appliance such that the in-memory data structure is mirrored across all the memories. In this manner, any processor may use its own memory to determine the location of a data (as defined by an n-tuple, discussed above) in the storage appliance. This functionality allows any processor to service any I/O request in regards to the location of the data within the storage module. Further, by mirroring the in-memory data structures, the storage appliance may continue to operate when one of the memories fails.

According to some embodiments, some of the components described above, such as control module(s) and/or storage module(s) may be integrated within a communication fabric, such as a PCIe fabric.

Figure 6:
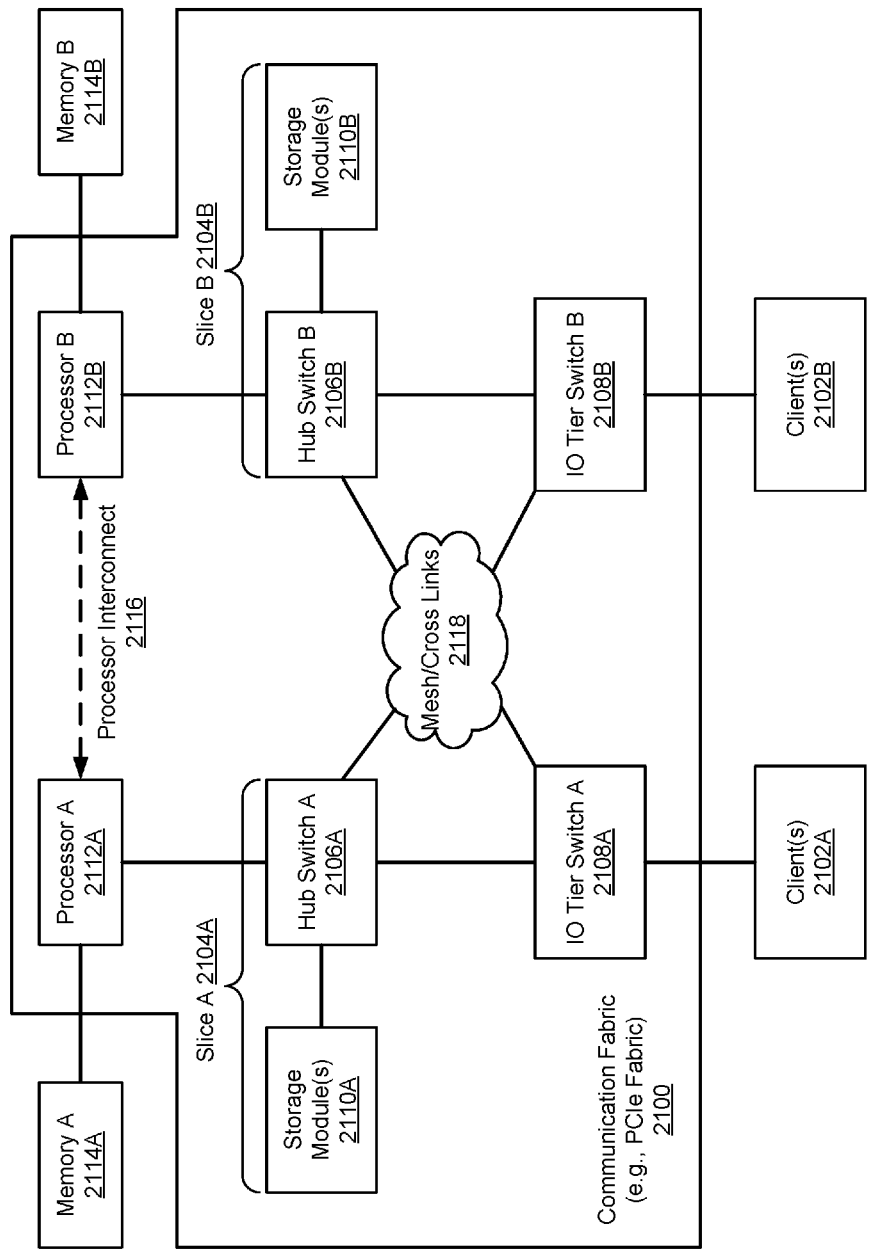
FIG. 6 is a block diagram illustrating an example of a communication fabric according to one embodiment of the invention.
Figure 7:
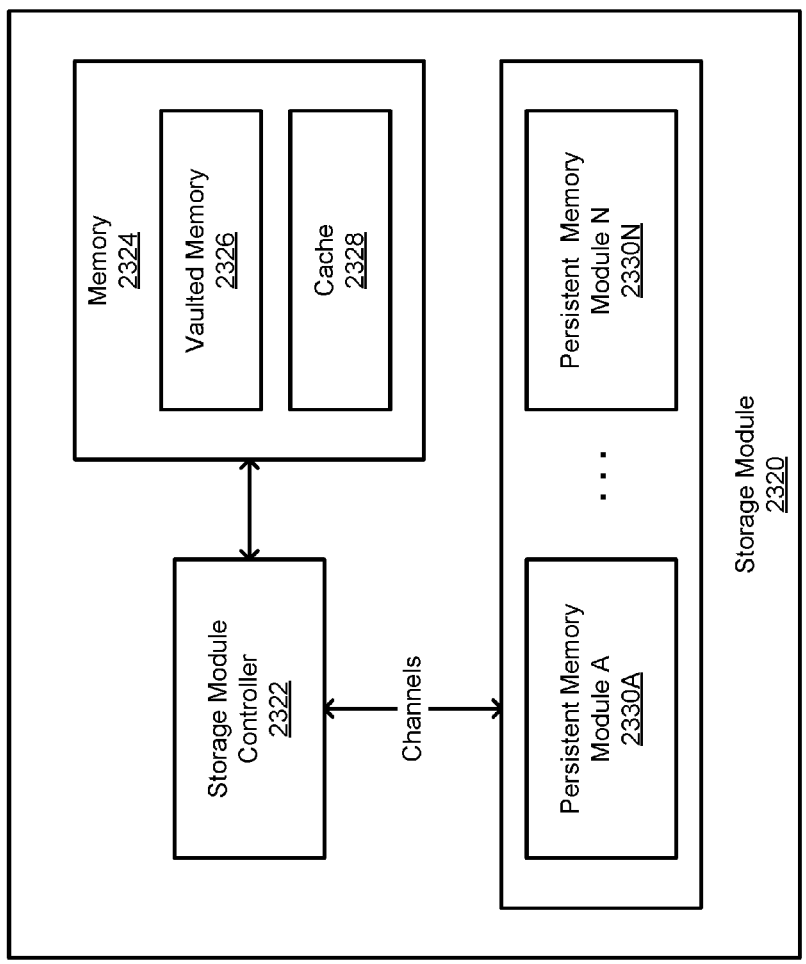
FIG. 7 is a block diagram illustrating an example of a storage module according to one embodiment of the invention.

FIG. 6 is a block diagram illustrating a system having a communication fabric according to one embodiment of the invention. In this example, a PCIe fabric is utilized as an example of a communication fabric for the purpose of illustration. However, it will be appreciated that other types of communication fabrics can also be applied. In one embodiment, PCIe Fabric (2100) is made up of two or more slices (2104A, 2104B), where each of the slices is connected or coupled to a processor (2112A, 2112B) and one or more clients (2102A-2102B). Clients 2102A-2102B may represent any of the clients described above.

In one embodiment, each client (2102A-2102B) is a physical device that includes a processor (or another type of processing component), memory, and a physical interface(s) to enable it to connect to the PCIe fabric (2100). Further, each client includes functionality to implement the PCIe standard (or portions thereof) that are required to implement one or more embodiments of the invention. The clients 2102A-2102B also include functionality to send and/or receive transaction layer packets (TLP). A TLP corresponds to a type of packet that is defined in accordance with the PCIe standard. In one embodiment of the invention, the TLPs enable clients to read data from the PCIe fabric and write data to the PCIe fabric. Said another way, the TLPs enable clients to transfer data to and from locations in the PCIe fabric. In one embodiment of the invention, one or more of the clients operates as a PCIe endpoint, i.e., a device that originates a transaction and/or a device that is the target of the transaction. Each of the clients may be connected to PCIe fabric via a link, i.e., physical connection between the client and the PCIe fabric.

Each slice (2104A, 2104B) includes an Input/Output (IO) tier switch (ITS) (2108A, 2108B), a hub tier switch (HTS) (2106A, 2106B), and one or more persistent storage modules (PSMs) 2110A-2110B. With respect to the ITS, each ITS is a physical PCIe switch that is connected to one or more clients (2102A-2102B). Each ITS is also connected or coupled to a HTS in the same slice in which the ITS is located. In addition, each ITS may be connected or coupled to one or more HTSes in different slices than the one in which the ITS is located. In one embodiment of the invention, each ITS is connected to every HTS in the PCI fabric resulting in a fully connected mesh between the tiers in the PCIe fabric. Embodiments of the invention may be implemented without a fully connected mesh between the tiers without departing from the invention.

In one embodiment of the invention, each ITS is configured to: (i) receive TLPs from the clients with which it is connected and route the TLPs to the appropriate egress port (either the upstream port or one of the downstream ports) on the ITS using address routing, such as memory address routing, and (ii) receive TLPs from one or more HTSes to which the ITS is connected and route the TLPs to the appropriate egress port (typically a downstream port) on the ITS using address routing.

Each HTS is a physical PCIe switch that is connected or coupled to one or more ITSes (2108A-2108B) and to one or more persistent storage modules (PSMs (2110A-2110B). Each HTS is connected or coupled to an ITS in the same slice in which the HTS is located. In addition, each HTS may be connected to zero or more ITSes in different slices than the one in which the HTS is located. In one embodiment of the invention, each HTS is connected to every other ITS in the PCIe fabric resulting in a fully connected mesh between the tiers in the PCIe fabric. Each HTS may also be connected to a processor via its root port (not shown). Embodiments of the invention may be implemented without a fully-connected mesh between the tiers without departing from the invention.

In one embodiment, each HTS is configured to: (i) receive TLPs from the persistent storage modules (PSM) with which it is connected and route the TLPs to the appropriate egress port (typically a downstream port) on the HTS using address routing and (ii) receive TLPs from one or more ITSes to which the HTS is connected and route the TLPs to the appropriate egress port (either the upstream port and/or one or more of the downstream ports) on the HTS using address routing.

In one embodiment, each of the storage modules (2100A-2110B) includes persistent storage (not shown) and, optionally, volatile memory (not shown) (e.g., Dynamic Random-Access Memory (DRAM), Synchronous DRAM, SDR SDRAM, and DDR SDRAM). The persistent storage may include, but is not limited to, NAND Flash memory, NOR Flash memory, Magnetic RAM Memory (M-RAM), Spin Torque Magnetic RAM Memory (ST-MRAM), Phase Change Memory (PCM), memristive memory, any other memory defined as non-volatile Storage Class Memory (SCM), magnetic disks, and optical disks. Those skilled in the art will appreciate that embodiments of the invention are not limited to storage class memory. In one embodiment of the invention, each of the PSMs is part of only one slice.

Each of processors 2112A-2112B may be a group of electronic circuits with a single core that is configured to execute instructions or multiple cores that are configured to execute instructions. The processor may be implemented using a Complex Instruction Set (CISC) Architecture or a Reduced Instruction Set (RISC) Architecture. In one or more embodiments of the invention, the processor includes a root complex (as defined by the PCIe standard) (not shown). The root complex connects the processor to at least one slice and to memory (114A, 114B) (e.g., Dynamic Random-Access Memory (DRAM), Synchronous DRAM, SDR SDRAM, and DDR SDRAM) that is accessible via the PCIe fabric but that is not part of any slice in the PCIe fabric.

In one embodiment, processors (2112A, 2112B) within the PCIe fabric 2100 are able to communicate using, for example, a processor interconnect (2116) such as Intel QuickPath Interconnect, Intel Front Side Bus, or AMD HyperTransport. Those skilled in the art will appreciate that other point-to-point communication mechanisms may be used to permit direct communication between the processors (2112A, 2112B) without departing from embodiments of the invention. While clients are connected or coupled to the ITSes and PSMs are connected or coupled to the HTSes, clients may also be connected or coupled to the HTSes and PSMes are connected to the ITSes.

In another embodiment, the PCIe fabric may be implemented such that it does not include any PSMs 2110A-2110B; rather, both the ITSes and the HTSes are connected to separate sets of clients, wherein the PCIe fabric facilitates communication between the clients. Further, while the PCIe fabric shown only includes two slices, two processors, and four PSMs, PCIe fabric 2100 may be implemented with a fewer or greater number of each of the aforementioned components without departing from the invention. In addition, while the PCIe fabric 2100 is connected to four clients and two memories, embodiments of the invention may be implemented to enable the PCIe fabric to connect with a fewer or greater number of clients and/or memories.

Further, while embodiments of the invention have been described with respect to a PCIe fabric that includes storage (e.g., PSM 2110A-2110B), embodiments of the invention may be implemented to enable any two devices to communicate using the PCIe fabric. For example, in one embodiment of the invention, the clients may be blade servers, where the blade servers do not include any physical NIC cards and PSMs may be replaced with network endpoint devices.

In this example, network endpoint devices are devices that are configured to interface with both a network (i.e., a wired network, a wireless network or a combination thereof)

using a networking protocol and with the PCIe fabric via PCIe. An example of network endpoint device is a PICe NIC card. The network endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory).

In another example, in one or more embodiments of the invention, the PSMs 2110A-2110B may be replaced with storage endpoint devices (i.e., devices that include functionality to store data and service read and write requests from clients). The storage endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory). An example of the storage endpoint device is a storage appliance. The invention is not limited to this example.

Further, embodiments of the invention may be extended to cover two or more devices communicating via a PCIe fabric. In the general case, the PSM 2110A-2110B may be generalized to a target device, where the target device may include the PSM, a network endpoint device, a storage endpoint device, or any other device capable of communicating using PCIe. While the PCIe Fabric 2100 has been shown as including the PSMs (or more generally target devices), the PCIe Fabric 2100 may be implemented such that it does not include the target devices; rather, the PCIe Fabric 2100 only include the necessary physical components to connect to the target devices.

FIG. 8 is a block diagram illustrating an example of a storage module according to one embodiment of the invention. The storage module 2320 includes a storage module controller (2322), memory (2324), and one or more persistent memory modules (2330A-2330N). Persistent memory modules 2330A-2330N may be solid state memory devices such as flash memory devices. In one embodiment, the storage module controller (2322) is configured to receive requests to read from and/or write data to one or more control modules. Further, the storage module controller (2322) is configured to service the read and write requests using the memory (2324) and/or the persistent memory modules (2330A-2330N). The storage module controller (2322) may include a DMA engine, where the DMA engine is configured to read data from the memory (2324) or from one of the persistent memory modules (2330A-2330N) and write a copy of the data to a physical address in a client memory. Further, the DMA engine may be configured to write data from the memory (2324) to one or more of the persistent memory modules. In one embodiment of the invention, the DMA engine is configured to be programmed by the processor.

The memory (2324) may be any volatile memory including, but not limited to, Dynamic Random-Access Memory (DRAM), Synchronous DRAM, SDR SDRAM, and DDR SDRAM. The memory (2324) may be logically or physically partitioned into vaulted memory (2326) and cache (2328). The storage module controller (2322) is configured to write out the entire contents of the vaulted memory (2326) to one or more of the persistent memory modules (2330A-2330N) in the event of notification of a power failure (or another event in which the storage module may lose power) in the storage module. In one embodiment of the invention, the storage module controller (2322) is configured to write the entire contents of the vaulted memory (2326) to one or more of the persistent memory modules (2330A-2330N) between the time of the notification of the power failure and the actual loss of power to the storage module. In contrast, the content of the cache (2328) is lost in the event of a power failure (or another event in which the storage module may lose power).

The persistent memory modules may be any data storage device that uses solid-state memory to store persistent data. In one embodiment of the invention, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to storage class memory.

In one embodiment, the following storage locations are part of a unified address space: (i) the portion of the client memory accessible via the client switch, (ii) the memory in the control module, (iii) the memory in the storage modules, and (iv) the solid state memory modules. Accordingly, from the perspective of the processor in the storage appliance, the aforementioned storage locations (while physically separate) appear as a single pool of physical addresses. Said another way, the processor may issue read and/or write requests for data stored at any of the physical addresses in the unified address space. The aforementioned storage locations may be referred to as storage fabric that is accessible using the unified address space. A unified address space is created, in part, by the non-transparent bridge in the client switch which allows the processor in the control module to "see" a portion of the client memory. Accordingly, the processor in the control module may perform read and/or write requests in the portion of the client memory that it can "see."

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A storage system, comprising:
a communication fabric;
a client device connected to the communication fabric;
a first control module (CM) connected to the client device via the communication fabric;
a second CM connected to the client device via the communication fabric, wherein the first CM and the second CM are connected to each other via an inter-processor link; and
a storage module connected to the communication fabric, the storage module having a first storage partition associated with the first CM,
wherein the first CM is adapted to
in response to a data fragment written by the client device, create a table of contents (TOC) entry in a TOC page maintained in the first storage partition, the TOC entry describing the data fragment,
update a flash translation layer (FTL) map maintained in a first memory device associated with the first CM, wherein the FTL map is utilized by the first CM to access data fragments in response to requests from a plurality of client devices,
determine whether the TOC page contains a predetermined number of TOC entries, and
in response to determining that the TOC page contains the predetermined number of TOC entries, send a control signal to the second CM via the inter-processor link, wherein the control signal indicates at least a location of the TOC page in the first storage partition,
wherein in response to the control signal received from the first CM via the inter-processor link, the second CM is to copy the TOC page from the first storage partition to a memory associated with the second CM via the communication fabric separate from the inter-processor link.

2. The storage system of claim 1, wherein for each data segment to be written to the storage module, once the data fragment has been stored in the storage module and a corresponding TOC entry has been created, the first CM returns an acknowledgment to the client device.

3. The storage system of claim 1, wherein the new TOC entry is created by the first CM within the TOC page maintained in the first memory device associated with the first storage partition.

4. The storage system of claim 3, wherein in response to the control signal, the second CM copies the TOC page from the first storage location of the first storage partition to a second memory device of the second CM.

5. The storage system of claim 4, wherein the second CM is to update a flash translation layer (FTL) map maintained in the second memory device based on the TOC page, and wherein the FTL map is utilized by the second CM to access data fragments in response to requests from a plurality of client devices.

6. The storage system of claim 1, wherein the storage module comprises a random access memory (RAM) device and a persistent storage device, and wherein the RAM device and the persistent storage device are logically partitioned into a first storage partition associated with the first CM and a second storage partition associated with the second CM.

7. The storage system of claim 6, wherein data written in the persistent storage device is in data blocks compatible with a write and erase unit of the persistent storage device, wherein each data block comprises one or more TOC pages describing one or more data pages, and wherein each TOC page comprises one or more TOC entries describing one or more data fragments of a data page.

8. The storage system of claim 1, wherein the communication fabric comprises a peripheral component interface express (PCIe) fabric.

9. A computer-implemented method for accessing data in a storage system, the method comprising:
in response to a data fragment written from a client device, creating by a first control module a table of contents (TOC) entry in a TOC page maintained in a first storage partition of a storage module, the TOC entry describing the data fragment, wherein the client device is connected to the first CM and the storage module over a communication fabric;
updating a flash translation layer (FTL) map maintained in a first memory device associated with the first CM, wherein the FTL map is utilized by the first CM to access data fragments in response to requests from a plurality of client devices;
determining by the first CM whether the TOC page contains a predetermined number of TOC entries;
in response to determining that the TOC page contains the predetermined number of TOC entries, transmitting a control signal from the first CM to a second CM via the inter-processor link, wherein the second CM is connected to the client device and the storage module over the communication fabric, wherein the control signal indicates at least a location of the TOC page in the first storage partition; and
in response to the control signal received from the first CM via the inter-processor link, replicating the TOC page from the first storage partition to a memory associated with the second CM via the communication fabric separate from the inter-processor link, wherein the first storage partition is associated with the first CM.

10. The method of claim 9, wherein for each data segment to be written to the storage module, once the data fragment has been stored in the storage module and a corresponding TOC entry has been created, the first CM returns an acknowledgment to the client device.

11. The method of claim 9, wherein the new TOC entry is created by the first CM within the TOC page maintained in the first memory device associated with the first storage partition.

12. The method of claim 11, wherein in response to the control signal, the second CM copies the TOC page from the first storage location of the first storage partition to a second memory device of the second CM.

13. The method of claim 12, wherein the second CM is to update a flash translation layer (FTL) map maintained in the second memory device based on the TOC page, and wherein the FTL map is utilized by the second CM to access data fragments in response to requests from a plurality of client devices.

14. The method of claim 9, wherein the storage module comprises a random access memory (RAM) device and a persistent storage device, and wherein the RAM device and the persistent storage device are logically partitioned into a first storage partition associated with the first CM and a second storage partition associated with the second CM.

15. The method of claim 14, wherein data written in the persistent storage device is in data blocks compatible with a write and erase unit of the persistent storage device, wherein each data block comprises one or more TOC pages describing one or more data pages, and wherein each TOC page comprises one or more TOC entries describing one or more data fragments of a data page.

16. The method of claim 9, wherein the communication fabric comprises a peripheral component interface express (PCIe) fabric.

17. A non-transitory machine-readable medium having instructions stored therein, which when executed by a machine, cause the machine to perform operations of accessing data in a storage system, the operations comprising:
in response to a data fragment written from a client device, creating by a first control module a table of contents (TOC) entry in a TOC page maintained in a first storage partition of a storage module, the TOC entry describing the data fragment, wherein the client device is connected to the first CM and the storage module over a communication fabric;
update a flash translation layer (FTL) map maintained in a first memory device associated with the first CM, wherein the FTL map is utilized by the first CM to access data fragments in response to requests from a plurality of client devices;
determining by the first CM whether the TOC page contains a predetermined number of TOC entries;
in response to determining that the TOC page contains the predetermined number of TOC entries, transmitting a control signal from the first CM to a second CM via the inter-processor link, wherein the second CM is connected to the client device and the storage module over the communication fabric, wherein the control signal indicates at least a location of the TOC page in the first storage partition; and
in response to the control signal received from the first CM via the inter-processor link, replicating the TOC page from the first storage partition to a memory associated with the second CM via the communication fabric separate from the inter-processor link, wherein the first storage partition is associated with the first CM.

18. The non-transitory machine-readable medium of claim 17, wherein for each data segment to be written to the storage module, once the data fragment has been stored in the storage module and a corresponding TOC entry has been created, the first CM returns an acknowledgment to the client device.

19. The non-transitory machine-readable medium of claim 17, wherein the new TOC entry is created by the first CM within the TOC page maintained in the first memory device associated with the first storage partition.

20. The non-transitory machine-readable medium of claim 19, wherein in response to the control signal, the second CM copies the TOC page from the first storage location of the first storage partition to a second memory device of the second CM.

21. The non-transitory machine-readable medium of claim 20, wherein the second CM is associated with a second CM memory device, wherein the second CM copies the TOC page from the first memory location of the first storage partition to the second CM memory device to incorporate the contents of the TOC page with a flash translation layer (FTL) map maintained in the second CM memory device.

22. The non-transitory machine-readable medium of claim 17, wherein the storage module comprises a random access memory (RAM) device and a persistent storage device, and wherein the RAM device and the persistent storage device are logically partitioned into a first storage partition associated with the first CM and a second storage partition associated with the second CM.

23. The non-transitory machine-readable medium of claim 22, wherein data written in the persistent storage device is in data blocks compatible with a write and erase unit of the persistent storage device, wherein each data block comprises one or more TOC pages describing one or more data pages, and wherein each TOC page comprises one or more TOC entries describing one or more data fragments of a data page.

24. The non-transitory machine-readable medium of claim 17, wherein the communication fabric comprises a peripheral component interface express (PCIe) fabric.

* * * * *